United States Patent [19]

Katsimbas

[11] 4,095,002

[45] June 13, 1978

[54] HEAT-CURABLE PULVERULENT COATING AGENT OF A MIXTURE OF COPOLYMERS CONTAINING GLYCIDYL GROUPS AND AN ADDUCT OF ALIPHATIC DICARBOXYLIC ACID AND 2,4,6-TRIS(N',N'',N'''-DIMETHYLAMINOMETHYL)-PHENOL

[75] Inventor: Themistoklis Katsimbas, Hamburg, Germany

[73] Assignee: Hoechst Aktiengesellschaft, Frankfurt am Main, Germany

[21] Appl. No.: 560,636

[22] Filed: Mar. 21, 1975

[30] Foreign Application Priority Data

May 22, 1974 Germany .............................. 2424809

[51] Int. Cl.² ............................................ C08L 63/00
[52] U.S. Cl. ...................................... 427/27; 260/836; 427/375
[58] Field of Search ..................... 427/13, 375, 27, 25; 260/836; 239/3

[56] References Cited

U.S. PATENT DOCUMENTS

| 3,752,870 | 8/1973 | Labana | 260/836 |
| 3,758,427 | 9/1973 | Katsibas | 260/19 EP |

FOREIGN PATENT DOCUMENTS 2,214,650    0000   Germany.

OTHER PUBLICATIONS

Bulletin, "Curing Agents for Epoxide Resins," Anchor Chemical Co. Ltd., Man. 11, Eng. pp. 7 & 8.

*Primary Examiner*—Bernard D. Pianalto
*Attorney, Agent, or Firm*—Gordon W. Hueschen

[57] ABSTRACT

The invention relates to heat-curable, pulverulent coating agents, frequently also referred to as powder lacquers, which can be used to apply a coherent coating having excellent properties after heat-curing. The coating agent contains a specifically selected acrylic resin and a specific curing agent.

12 Claims, No Drawings

HEAT-CURABLE PULVERULENT COATING AGENT OF A MIXTURE OF COPOLYMERS CONTAINING GLYCIDYL GROUPS AND AN ADDUCT OF ALIPHATIC DICARBOXYLIC ACID AND 2,4,6-TRIS(N',N'',N'''-DIMETHYLAMINOMETHYL)-PHENOL

BACKGROUND OF THE INVENTION

It is already known to manufacture, and use, heat-curable pulverulent coating agents based on copolymers which contain glycidyl groups. However, such known products have the disadvantage that they have to be stoved at temperatures above 200° C to give resistant films.

If attempts are made to lower the stoving temperatures of such known pulverulent coating agents by addition of accelerators, the effect is inadequate or the films obtained yellow already during the stoving process; at times, the adhesion is also impaired.

Such known powder coating agents are described in German Published Specification 2,240,312, 2,240,314, 2,240,315, 2,057,577, 2,064,916, 2,214,650 and 2,122,313.

1. It is the object of the present invention to provide a heat-curable, pulverulent coating agent which simultaneously shows improvements in various directions compared to the known pulverulent coating agents. One aim is that it should be possible to manufacture the pulverulent agent by simple mixing, homogenizing fusion and conjoint grinding of the requisite components.

2. The pulverulent coating agent manufactured by intensive mixing, homogenizing fusion and grinding should be stable on storage at the customary storage temperatures of between about −40 to +40° C.

3. The coating agent should, after application, give very glossy non-yellowing coatings, with good levelling properties and freedom from blisters and craters, merely by stoving at about 150° to 180° C for about 15 to 30 minutes.

4. The stoved films should not yellow and should show excellent weathering resistance and substantially improved resistance to organic solvents and chemicals, the comparison being relative to powder lacquers based on acrylate copolymers.

SUMMARY

The subject of the invention is a pulverulent coating agent of a mixture of

A. a copolymer which contains glycidyl groups and which is a copolymer of several ethylenically unsaturated compounds and has a relatively low molecular weight, B. at least one aliphatic dicarboxylic acid, in an amount corresponding to 0.8 – 1.1 acid groups per epoxy group of the copolymer and optionally C. a flow control agent, in an amount of at least 0.05 percent by weight of the mixture, which is a polymer of molecular weight ($M_n$) at least 1,000 and has a glass transition temperature which is at least 50° C lower than the glass transition temperature of the copolymer (A) and D. other customary additives, charaterised in that the component A. consists of 80 to 96 percent by weight of copolymers, containing epoxide groups and hydroxyl groups, which have Durran softening points of about 90° – 120° C and are soluble in organic solvents, of a. 4 to 28 percent by weight of ethylenically unsaturated epoxide monomers with 6 – 12 carbon atoms, of the general formula

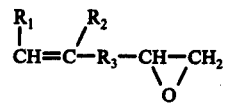

wherein $R_1$ and $R_2$ = H or —CH$_3$ $R_3$ = —C(=O)—O—CH$_2$ or —CH$_2$—O—CH$_2$ or —CH$_2$—O—C(=O)—CH=CH—C(=O)—O—CH$_2$ or —CH$_2$—O—C(=O)—C$_6$H$_4$—C(=O)—O—CH$_2$— or is absent, b. 10 – 96 percent by weight of acrylic acid esters or methacrylic acid esters of aliphatic saturated monoalcohols with 1 – 8 carbon atoms and optionally c. up to 70 percent by weight of styrene or vinyltoluene; and B. consists of 4 – 20 percent by weight of an adduct of a saturated straight-chain aliphatic dicarboxylic acid of the formula HOOC—(C$_2$)$_n$—COOH, wherein $n$ is a whole number from 5 to 12, and 2,4,6-tris(N',N'',N'''-dimethylaminomethyl)-phenol, and these components of the adduct can be present in a weight ratio of 97 : 3 to 99 : 1; optionally together with C. a flow control agent and D. other customary additives.

In a preferred embodiment of the invention the component (A) consists of a copolymer of:

a. 14 to 18 percent by weight of glycidyl methacrylate, b. 10 to 14 percent by weight of 2-ethylhexyl acrylate and 25 to 35 percent by weight of methyl methacrylate and c. 40 to 55 percent by weight of styrene.

In a further preferred embodiment of the invention the component (A) consists of a copolymer of:

a. 14 to 18 percent by weight of glycidyl methacrylate, b. 10 to 14 percent by weight of 2-ethylhexyl acrylate and 40 to 55 percent by weight of methyl methacrylate and c. 25 to 35 percent by weight of styrene.

In a further preferred embodiment of the invention the component (A) consists of a copolymer of:

a. 16 to 26 percent by weight of glycidyl methacrylate, b. 25 to 40 percent by weight of butyl methacrylate and c. 40 to 60 percent by weight of styrene.

In a further preferred embodiment of the invention the component (A) consists of a copolymer of:

a. 16 to 24 percent by weight of glycidyl methacrylate, b. 40 to 55 percent by weight of methyl methacrylate and 30 to 40 percent by weight of butyl methacylate and c. 0 to 30 percent by weight of styrene.

As component a) it is possible to use ethylenically unsaturated epoxy monomers with 6 – 12 carbon atoms, of the general formula

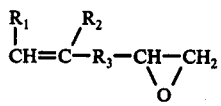

wherein $R_1$ and $R_2$ = H— or —$CH_3$,

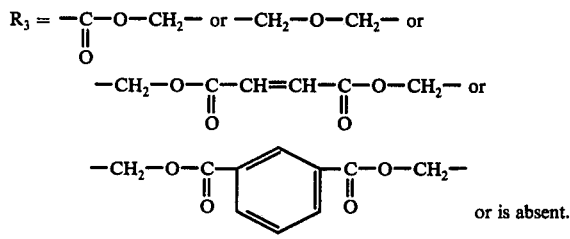

These include: glycidyl acrylate, glycidyl methacrylate, allyl glycidyl ether, methallyl glycidyl ether, glycidyl crotonate, vinyl glycidyl ether, allyl glycidyl maleate, allyl glycidyl phthalate and butadiene monoxide.

As component (b) it is possible to use acrylic acid esters or methacrylic acid esters of aliphatic saturated monoalcohols with 1 – 8 carbon atoms: methyl methacrylate, ethyl acrylate, butyl acrylate, 2-ethylhexyl acrylate, 2-ethylhexyl methacrylate, isobutyl acrylate and butyl methacrylate. n-Butyl acrylate, n-butyl methacrylate or 2-ethylhexyl acrylate are preferentially employed.

Styrene or vinyltoluene is co-used as component c).

The copolymers are manufactured according to known processes of bulk polymerisation, solution polymerisation and dispersion polymerisation, preferably by solution polymerisation. Such processes are described, for example, in Methoden der Organischen Chemie (Methods of Organic Chemistry), Houben-Weyl, 4th Edition, Volume 14/1, pages 24 to 556 (1961).

If the polymerisation is carried out in solution, it is possible to employ solvents, such as methylene chloride, ethanol, iso-propanol, n-propanol, n-butanol, iso-butanol, tert.-butanol; the methyl, ethyl, propyl or butyl esters of acetic acid, acetone, methyl ethyl ketone, benzene, toluene and others.

The polymerisation is carried out at temperatures of 40° to about 120° C.

Examples of initiators which can be employed are percarbonates, peresters, such as tert.-butyl perpivalate, or peroctoate, benzoyl peroxide, o-methoxybenzoyl peroxide, dichlorobenzoyl peroxide and azodiisobutyro dinitrile, in amounts of 0.5 to 8% by weight, based on monomers.

Furthermore, customary molecular weight regulators, such as n-dodecylmercaptan or tert.-dodecylmercaptan, can be co-used.

The copolymer solution is freed from the solvent by distilling off the latter in vacuo or in suitable apparatuses, preferably vapouriser screws, at temperatures of about 90 to 220° C, and is cooled, granulated and ground. However, the product can also be isolated in accordance with other processes, say by spray drying, removal of the solvent with steam and simultaneous dispersion in water, or precipitation with water from a water-miscible solvent.

Dicarboxylic acids which have 7 to 14 carbon atoms in the aliphatic chain and can be used for the manufacture of the adduct (component (B)) are pimelic acid, suberic acid, azelaic acid, sebacic acid, decane-1,10-dicarboxylic acid and undecane-1,11-dicarboxylic acid. In general, aliphatic dicarboxylic acids with a melting point in the range from 80° to 160° are preferred.

It is known to use 2,4,6-tris(N′,N″,N‴-dimethylaminomethyl)-phenol as a curing agent (primary curing agent) for epoxide resins. Furthermore, its use in combination with polyaminoamides for the same purpose is known. The addition of catalytic amounts of 2,4,6-tris-(N′,N″,N‴-dimethylaminomethyl)-phenol has been recommended for epoxide resin coatings which contain a curing agent (compare the bulletin "Curing Agents for Epoxide Resins" of ANCHOR Chemical Company Ltd., Manchester 11, England, page 7 and 8).

However, it was not known, and also not to be expected that this known curing agent, in the form of an adduct with straight-chain aliphatic dicarboxylic acids with 7 to 14 carbon atoms in the aliphatic chain, would exert an accelerating effect on the curing of the epoxide resins by acids, with, surprisingly, no yellowing occurring during or after curing, and with the flow control agent (C) frequently no longer being required.

As the flow control agent (C) it is possible to use, in the pulverulent coating agent, an acrylic polymer having a glass transition temperature which is at least 50° C lower than the glass transition temperature of the copolymer used in the mixture.

Preferred acrylic polymers which can be used as flow control agents are polylauryl acrylate, polybutyl acrylate, poly(2-ethylhexyl acrylate), polylauryl methacrylate and polyisodecyl methacrylate.

The flow control agent (C) can also be a fluorinated polymer which has a lower surface tension, at the stoving temperature of the powder mixture, than the copolymer used in the mixture. If a fluorinated polymer is used as the flow control agent, esters of polyethylene glycol or polypropylene glycol and fluorinated fatty acids are preferred. An example of a suitable flow control agent is an ester of polyethylene glycol, of molecular weight above 2,500, and perfluorooctanoic acid. Furthermore, levelling agents, such a silicones, polyesters, ketone resins, epoxide resins and cellulose derivatives, can be added to the melts. It is also possible to add pigments, flow control agents and other additives customary in such coating agents.

The adduct of a saturated straight-chain aliphatic dicarboxylic acid with 7 to 14 carbon atoms in the aliphatic chain and 2,4,6-tris(N′,N″,N‴-dimethylaminomethyl)-phenol is manufactured by fusing the aliphatic dicarboxylic acid under an inert gas, for example nitrogen, and introducing the 2,4,6-tris(N′,N″,N‴-dimethylaminomethyl)-phenol whilst continuing to heat the melt for 5 to 10 minutes, after which the melt is chilled. The temperatures of the melt are approximately between 80° and 160° C. The chilling is carried out, for example, by pouring the adduct melt onto cold metal sheets.

Adducts which can be used may have the following composition: 98 parts by weight of pimelic acid and 2 parts by weight of 2,4,6-tris(N′,N″,N‴-dimethylaminomethyl)-phenol, 98 parts by weight of suberic acid and 2 parts by weight of 2,4,6-tris(N′,N″,N‴-dimethylaminomethyl)-phenol, 98 parts by weight of azelaic acid and 2 parts by weight of 2,4,6-tris-(N′,N″,N‴-dimethylaminomethyl)-phenol, 98.5 parts by weight of azelaic acid and 1.5 parts by weight of 2,4,6-tris(N',N",N'"-dimethylaminomethyl)-phenol, 99 parts by weight of azelaic acid and 1 part by weight of 2,4,6-tris-(N',N",N'"-dimethylaminomethyl)-phenol, 98 parts by weight of sebacic acid and 2 parts by weight of 2,4,6-tris(N',N"-N'"-dimethylaminomethyl)-phenol, 98.5 parts by weight of sebacic acid and 1.5 parts by weight of 2,4,6-tris(N',N",N'"-dimethylaminomethyl)-phenol and 97.5 parts by weight of undecane-1,11-dicarboxylic acid and 2.5 parts by weight of 2,4,6-tris(N',N",N'"-dimethylaminomethyl)-phenol.

Preferred adduct compositions are the following: 98 parts by weight of azelaic acid and 2 parts by weight of 2,4,6-tris(N',N",N'"-dimethylaminomethyl)-phenol and 98 parts by weight of sebacic acid and 2 parts by weight of 2,4,6-tris(N',N",N'"-dimethylaminomethyl)-phenol.

Especially good results are achieved by an adduct of 97.8 parts by weight decane-1,10-dicarboxylic acid and 2.2 parts by weight of 2,4,6-tris(N',N",N'"-dimethylaminomethyl)-phenol if excellent good stability on storage of the coating agent ready for use is estimated and if one requires excellent good levelling properties, gloss and adhesion of the cured coatings.

The solvent-free, optionally pigmented components, which are brittle in the non-crosslinked state, are ground to particles of about 100 to 300 μm size, fused at about 95° – 110° C whilst mixing or kneading thoroughly, cooled and, after solidification, again ground to finest particle size.

It is preferred to grind to the finest particle size of 5 to 120 μm. The most preferred range of finest grinding is seen between 5 and 75 μm. Moreover, the grinding products can be obtained by sifting according to particle size.

The pulverulent coating agents to be used according to the invention are still free-flowing at temperatures of at least 30° – 40° C, preferably 40° C, have levelling temperatures of approx. 80 to 120° C and are stoved at temperatures from 140° C to 190° C, preferably 160° to 180° C, at which cross-linking takes place. The stoved films should generally posses a layer thickness of 15 to 80 μm.

The pulverulent coating agent is applied to suitable substrates, especially metals, in accordance with the known methods, for example of the electrostatic powder spraying process.

The stoved films of the pulverulent coating agent used according to the invention have excellent adhesion and hardness coupled with elasticity. Furthermore they are distinguished by high gloss, very good weathering resistance and very good resistance to wash liquors.

The powders can be used for coating household equipment, metal components in automobile manufacture, metal components exposed to weathering factors, such as facade panels, pipes, wire netting, equipment for forestry and agriculture and other metal components for interior design.

The examples which follow describe the manufacture of the powders and their use as electrostatically sprayable powders. The parts and percentages mentioned in the examples are by weight, unless stated otherwise.

EXAMPLE 1

490 g of toluene are initially introduced into a two-liter stirred pot equipped with a reflux condenser, thermometer and two dropping funnels. The toluene is brought to the reflux temperature of about 112° C and two monomeric mixtures are added dropwise thereto simultaneously over the course of 4 hours, the mixtures being:

a. 550 g of styrene, 338 g of methyl methacrylate, 150 g of 2-ethylhexyl acrylate 212 g of glycidyl methacrylate and b. 44 g of tert.-butyl peroctoate and 44 g of toluene.

The mixture is then kept under reflux for a further hour and at the same time an additional 2 g of tert.-butyl peroctoate are added dropwise. Polymerisation is then continued for a further 2 hours under reflux at about 118°–120° C. The resulting copolymer has a Gardner-Holdt viscosity of M-N measured on a 50% strength solution in toluene at 20° C. On distilling off the toluene at temperatures up to 200° C under reduced pressure at 40 mm Hg, a brittle, clear solid resin which can easily be powdered, is obtained.

300 g of the resulting solid resin are ground with 40 g of an adduct consisting of 97.8% by weight of azelaic acid and 2.2% by weight of 2,4,6-tris(N',N",N'"-dimethylaminomethyl)-phenol and with 140 g of titanium dioxide (of the rutile type) of particle size about 80–200 μm. The powder mixture is then mixed for 4 minutes in an extruder at 104° C and the melt is chilled to room temperature and ground to give particles of approx. 80 μm.

The pulverulent coating agent is applied by means of an electro-spray gun onto degreased phosphatised galvanised steel sheets and then stoved for 30 minutes at 180° C.

Coatings having the following properties are obtained:

| | |
|---|---|
| coating thickness: | 55 – 60 μm |
| levelling, assessed visually:+ | 2 |
| folding test:+ | 0 – 1 |
| yellowing:+ | 0 – 1 |
| xylene resistance, 2 hours:+ | 0 |
| pencil hardness: | H5 |
| Erichsen deep-drawing value: | 7.2 mm |
| gloss, by the Lange method: | 92 |
| grid cut:+ | 0 |
| shelf-life rating of the made-up powders at 40° C, 7 days:+ | 0 – 1 |

+
0 = *best value*
5 = *worst value*

EXAMPLE 2

The procedure followed is as described in Example 1 but, in contrast thereto, a copolymer is produced, using 660 g of toluene and initiator, from the following monomer mixture:

a. 324 g of styrene, 443 g of methyl methacrylate, 129 g of 2-ethylhexyl acrylate and 184 g of glycidyl methacrylate, together with b. 60 g of toluene and 34 g of tert.-butyl peroctoate.

The copolymer obtained is converted in accordance with the instructions in Example 1 to give a pulverulent coating agent which in addition exhibits better levelling and better weathering resistance.

| Practical test of the coating agent to demonstrate the technical advance achieved | | | |
|---|---|---|---|
| | Stoving conditions | Coating thickness μm | Mandrel bending test ASTM D 522-41 |
| Example 2 of the present invention | 170° C/30 mins. | 50 – 60 | 0 – 1 |
| | 190° C/30 mins. | 52 – 60 | 0 |

| -continued | | | |
|---|---|---|---|
| Practical test of the coating agent to demonstrate the technical advance achieved | | | |
| The same resin, but with addition of the same amount of azelaic acid corresponding to German Published Specif. 2,214,650 | 170° C/30 mins. | 54 – 62 | 5 |
| | 190° C/30 mins. | 48 – 56 | 4 – 5 |

| | Erichsen deep-drawing value DIN 53156 | Gloss by the Lange method | Xylene resistance 15 mins. |
|---|---|---|---|
| Example 2 of the present invention | 7.2 | 94 | 0 |
| | 7.4 | 92 | 0 |
| The same resin, but with addition of the same amount of azelaic acid corresponding to German Published Specif. 2,214,650 | 0.8 | 96 | 5 |
| | 1.4 | 94 | 3 – 4 |

EXAMPLE 3

300 g of the copolymer obtained according to Example 2 are ground with 32 g of an adduct, consisting of:
98.5 percent by weight of decane-1,10-dicarboxylic acid,
1.5 percent by weight of 2,4,6-tris(N',N'',N''')-dimethylaminomethyl)-phenol and
132 g of titanium dioxide (of the rutile type) of particle size about 80 – 200 μm.

The powder mixture is then mixed for 4 minutes in an extruder at 100° C and the melt is chilled to room temperature and ground to give particles of approx. 80 μm.

The pulverulent coating is applied by means of an electro-spray gun onto degreased phosphatised galvanised steel sheets and then stoved for 30 minutes at 170° C.

Coatings having the following properties are obtained:

| | |
|---|---|
| coating thickness: | 55 – 60 μm |
| levelling, assessed visually:+ | 0 – 1 |
| folding test:+ | 0 |
| yellowing:+ | 0 – 1 |
| xylene resistance, 2 hours:+ | 0 |
| pencil hardness: | H5 |
| Erichsen deep-drawing value: | 8.7 mm |
| gloss, by the Lange method: | 108 |
| grid cut:+ | 0 |

+ 
0 = best value
5 = worst value

EXAMPLE 4

The procedure followed is as in Example 1, except that a copolymer is produced from the following monomer mixture:
567 g of styrene,
403 g of n-butyl methacrylate and
290 g of glycidyl methacrylate.
300 g of the resulting solid resin are ground with 40 g of and adduct consisting of
97.8 percent by weight of decane-1,10-dicarboxylic acid and
2.2 percent by weight of 2,4,6-tris(N',N'',N'''-dimethylaminomethyl)-phenol,
132 g of titanium dioxide (of the rutile type) of particle size about 80 – 200 μm and
6 g of an agent for improvement of pigment cross-linking, polyester based (Brochigol VL-73 BK 424, Firma Gebr. Borghers AG, Goslar).

The powder mixture is then mixed for 4 minutes in an extruder at 100° C and the melt is chilled to room temperature and ground to give particles of approx. 80 μm.

The pulverulent coating is applied by means of an electro-spray gun onto degreased phosphatised galvanised steel sheets and then stoved for 30 minutes at 180° C.

Coatings having the following properties are obtained:

| | |
|---|---|
| coating thickness:+ | 48 – 55 μm |
| levelling, assessed visually:+ | 1 |
| folding test:+ | 0 |
| yellowing:+ | 0 |
| xylene resistance, 2 hours:+ | 0 |
| pencil hardness: | H4 |
| Erichsen deep-drawing value: | 8.8 mm |
| gloss, by the Lange method: | 98 |
| grid cut:+ | 0 |

+
0 = best value
5 = worst value

The resulting coating agent shows an excellent stability on storage. The coating films stoved for 30 minutes at 160° – 190° C are distinguished by excellent levelling properties, high gloss and excellent adhesion on metal substrates.

EXAMPLE 5

The procedure followed is as in Example 1, except that a copolymer is produced from the following monomer mixture:
456 g of methyl methacrylate,
376 g n-butyl methacrylate and
248 g glycidyl methacrylate.

The resulting copolymer is manufactured as pulverulent coating agent according to Example 4.

What is claimed is:
1. A pulverulent coating agent comprising a mixture of
A. a copolymer which contains glycidyl groups and which is a copolymer of several ethylenically unsaturated compounds and has a relatively low molecular weight, and
B. an adduct of at least one aliphatic dicarboxylic acid, in an amount of from about 0.8 – 1.1 acid groups per glycidyl group of the copolymer, characterized in that component (A) consists of 80 to 96 percent by weight of copolymers, containing epoxide groups and hydroxyl groups, which copolymers have Durran softening points of about 90° – 120° C and are soluble in organic solvents, of
a. 4 to 28 percent by weight of ethylenically unsaturated epoxide monomers with 6 – 12 carbon atoms of the general formula

$$\begin{array}{c} R_1 \quad R_2 \\ | \quad\ \ | \\ CH=C-R_3-CH\underset{O}{-\!\!\!-\!\!\!-}CH_2 \end{array}$$

wherein
$R_1$ and $R_2$ = H or —$CH_3$

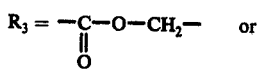

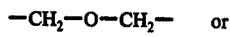

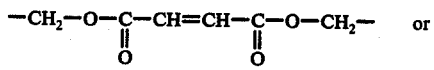

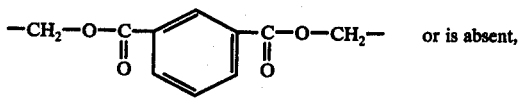 or is absent, b. 10 – 96 percent by weight of acrylic acid esters or methacrylic acid esters of aliphatic saturated monoalcohols with 1 – 8 carbon atoms, and c. up to 70 percent by weight of styrene or vinyltoluene; and (B) consists of 4 –20 percent by weight of an adduct of a saturated straight-chain aliphatic dicarboxylic acid of the formula HOOC—(CH$_2$)$_n$—COOH, wherein n is a whole number from 5 to 12, and 2,4,6-tris(N',N'',N'''-dimethylaminomethyl)-phenol, and these components of the adduct can be present in a weight ratio of 97:3 to 99:1.

2. A pulverulent coating agent according to claim 1, wherein the component (A) consists of a copolymer of:
 a. 14 to 18 percent by weight of glycidyl methacrylate,
 b. 10 to 14 percent by weight of 2-ethylhexyl acrylate and 25 to 35 percent by weight of methyl methacrylate and
 c. 40 to 55 percent by weight of styrene.

3. A pulverulent coating agent according to claim 1, wherein the component (A) consists of a copolymer of:
 a. 14 to 18 percent by weight of glycidyl methacrylate,
 b. 10 to 14 percent by weight of 2-ethylhexyl acrylate and 40 to 55 percent by weight of methyl methacrylate and
 c. 25 to 35 percent by weight of styrene.

4. A pulverulent coating agent according to claim 1, wherein the component (A) consists of a copolymer of:
 a. 16 to 26 percent by weight of glycidyl methacrylate,
 b. 25 to 40 percent by weight of butyl methacrylate and
 c. 40 to 60 percent by weight of styrene.

5. A pulverulent coating agent according to claim 1, wherein the component (A) consists of a copolymer of:
 a. 16 to 24 percent by weight of glycidyl methacrylate,
 b. 10 to 55 percent by weight of methyl methacrylate and 30 to 40 percent by weight of butyl methacrylate and
 c. 0 to 30 percent by weight of styrene.

6. A pulverulent coating agent according to claim 1, wherein the copolymer component (A) contains, as ethylenically unsaturated epoxide monomer (a), a compound selected from the group consisting of glycidyl acrylate, glycidyl methacrylate, allyl glycidyl ether, methallyl glycidyl ether, glycidyl crotonate, vinyl glycidyl ether, allyl glycidyl maleate, allyl glycidyl phthalate, and butadiene monoxide.

7. A pulverulent coating agent mixture according to claim 1, wherein the copolymer component (A) contains, as alkyl ester component (b), a compound selected from the group consisting of methyl methacrylate, ethyl acrylate, butyl acrylate, 2-ethylhexyl acrylate, 2-ethylhexyl methacrylate, isobutyl acrylate, and butyl methacrylate.

8. A pulverulent coating agent according to claim 1, wherein the aliphatic dicarboxylic acid component (B) consists of 8 – 12 percent by weight of an adduct, composed of 97.8 parts by weight of decane-1,10-dicarboxylic acid and 2.2. parts by weight of 2,4,6-tris(N',N'',N'''-dimethylaminomethyl)-phenol.

9. Process for the manufacture of the coating agent according to claim 1, characterised in that the components (A) and (B) are ground to particles of 100 to 300 μm size, fused at about 95° – 110° C while mixing or kneading thoroughly, cooled and, after solidification, again ground to particles of 5 to 120 μm size.

10. A method for coating a substrate which comprises applying to the substrate a film of the pulverulent coating agent of claim 1, which is still free-flowing at temperatures of from 30° – 40° C, preferably by the electrostatic powder spray process, and then stoving the filmed substrate at 140° to 190° C for about 15 to 30 minutes.

11. Method according to claim 10, wherein the stoved coating layer is present in a layer thickness of 15 to 80 μm.

12. A pulverulent coating agent according to claim 1, which includes a flow control agent which is a polymer of molecular weight ($M_n$) at least 1,000 and has a glass transition temperature which is at least 50° C lower than the glass transition temperature of the copolymer.

* * * * *

UNITED STATES PATENT AND TRADEMARK OFFICE
CERTIFICATE OF CORRECTION

PATENT NO. : 4,095,002
DATED : June 13, 1978
INVENTOR(S) : Themistoklis Katsimbas It is certified that error appears in the above-identified patent and that said Letters Patent are hereby corrected as shown below:

Col. 1, line 59; "$(M_n)$" should read --$(\overline{M}_n)$--
Col. 2, line 31; "$(C_2)n$" should read --$(CH_2)n$--
Col. 5, line 41; "posses" should read --possess--
Col. 10, line 47, claim 12; "$(M_n)$" should read --$(\overline{M}_n)$--
  Response & Amendment dated February 21, 1977, page 3, claim 14, line 3.
Col. 10, line 49, claim 12; "copolymer" should read --copolymer (A).-- Response & Amendment dated February 21, 1977, page 4, claim 14, line 2.

Signed and Sealed this

Fourteenth Day of November 1978

[SEAL]

Attest:

RUTH C. MASON
Attesting Officer

DONALD W. BANNER
Commissioner of Patents and Trademarks